United States Patent
Hong et al.

(10) Patent No.: US 7,772,303 B2
(45) Date of Patent: Aug. 10, 2010

(54) FLAME RETARDANT THERMOPLASTIC RESIN COMPOSITION HAVING EXCELLENT WEATHERABILITY

(75) Inventors: Sang Hyun Hong, Uiwang-Si (KR); Seon Ae Lee, Seoul (KR); Min Soo Lee, Ansan-Si (KR); Jin Hwan Choi, Anyang-Si (KR)

(73) Assignee: Cheil Industries Inc., Gumi-si (KR)

( * ) Notice: Subject to any disclaimer, the term of this patent is extended or adjusted under 35 U.S.C. 154(b) by 62 days.

(21) Appl. No.: 11/953,910

(22) Filed: Dec. 11, 2007

(65) Prior Publication Data

US 2008/0157038 A1    Jul. 3, 2008

(30) Foreign Application Priority Data

Dec. 27, 2006    (KR)    .................. 10-2006-0135397

(51) Int. Cl.
*C08K 5/3432*    (2006.01)
*C08K 5/5333*    (2006.01)

(52) U.S. Cl. ........................ 524/99; 524/117
(58) Field of Classification Search ............... 524/99, 524/100, 17, 140
See application file for complete search history.

(56) References Cited

U.S. PATENT DOCUMENTS

| | | |
|---|---|---|
| 3,639,506 A | 2/1972 | Haaf |
| 3,789,091 A | 1/1974 | Anderson et al. |
| 3,789,901 A | 2/1974 | Rishovd |
| 3,849,368 A | 11/1974 | Anderson et al. |
| 3,883,613 A | 5/1975 | Cooper |
| 4,273,881 A | 6/1981 | Otten |
| 4,397,759 A | 8/1983 | Hancock |
| 4,459,381 A | 7/1984 | Trivedi |
| 4,526,917 A | 7/1985 | Axelrod |
| 4,618,633 A | 10/1986 | Taubitz et al. |
| 4,632,946 A | 12/1986 | Muench et al. |
| 4,914,144 A | 4/1990 | Muehlbach et al. |
| 5,030,674 A | 7/1991 | Notorgiacomo, Jr. |
| 5,276,256 A | 1/1994 | Niessner et al. |
| 5,710,305 A | 1/1998 | Archer et al. |
| 5,859,147 A | 1/1999 | Dalla Torre et al. |
| 6,054,515 A | 4/2000 | Blount |
| 6,093,760 A | 7/2000 | Nishihara et al. |
| 6,262,166 B1 | 7/2001 | Yoshida et al. |
| 6,306,941 B1 | 10/2001 | Klatt et al. |
| 6,472,456 B1 * | 10/2002 | Horsey et al. .................. 524/99 |
| 7,365,114 B2 | 4/2008 | Hong et al. |
| 2006/0068317 A1 | 3/2006 | Klei et al. |
| 2006/0183825 A1 | 8/2006 | Ahn et al. |
| 2006/0183826 A1 | 8/2006 | Ryu et al. |
| 2006/0189729 A1 | 8/2006 | Bae et al. |
| 2006/0189730 A1 | 8/2006 | Hong et al. |
| 2007/0032579 A1 | 2/2007 | Ku et al. |
| 2007/0155875 A1 | 7/2007 | Ku et al. |
| 2007/0228343 A1 * | 10/2007 | Roth et al. .................. 252/601 |

FOREIGN PATENT DOCUMENTS

| | | | |
|---|---|---|---|
| DE | 4209029 A1 | | 9/1993 |
| EP | 0 075 863 | * | 4/1983 |
| EP | 0731140 A2 | | 9/1996 |
| EP | 0947547 A1 | | 10/1999 |
| EP | 1069157 A1 | | 1/2001 |
| EP | 1069158 A1 | | 1/2001 |
| EP | 1070744 A2 | | 1/2001 |
| JP | 60-079048 A | | 5/1985 |
| JP | 61-009450 | | 1/1986 |
| JP | 10-195287 A | | 7/1998 |
| JP | 11-501348 T | | 2/1999 |
| JP | 11-140270 A | | 5/1999 |
| JP | 11-343382 A | | 12/1999 |
| JP | 2001-040172 A | | 2/2001 |
| KR | 2001-0009848 A | | 2/2001 |
| KR | 2001-0083602 A | | 9/2001 |
| KR | 2003-0030421 A | | 4/2003 |
| KR | 2003-0078189 A | | 10/2003 |
| KR | 2004-0003563 A | | 1/2004 |
| KR | 2004-0027104 A | | 4/2004 |
| KR | 2004-0058773 A | | 7/2004 |
| WO | 9627637 A1 | | 9/1996 |
| WO | 98/11160 A1 | | 3/1998 |
| WO | 00/17268 A1 | | 3/2000 |
| WO | 2005/012416 A1 | | 2/2005 |
| WO | 2006/039440 A1 | | 4/2006 |

OTHER PUBLICATIONS

Chinese Office Action in counterpart Chinese Application No. 200710161095.5, mailed on Dec. 18, 2009.
English translation of Chinese Office Action in counterpart Chinese Application No. 200710161095.5, mailed on Dec. 18, 2009.

* cited by examiner

*Primary Examiner*—Peter Szekely
(74) *Attorney, Agent, or Firm*—Summa, Additon & Ashe, P.A.

(57) ABSTRACT

Disclosed herein is a flame retardant thermoplastic resin composition having excellent weatherability comprising (A) about 100 parts by weight of a rubber modified aromatic vinyl resin comprising ($a_1$) about 15 to about 100% by weight of a grafted copolymer resin prepared by graft-polymerizing about 5 to 65% by weight of a rubbery polymer, about 10 to 95% by weight of an aromatic vinyl monomer and about 0 to 40% by weight of a monomer copolymerizable with said aromatic vinyl monomer; and ($a_2$) about 0 to 85% by weight of a copolymer resin prepared by polymerizing about 40 to 90% by weight of an aromatic vinyl monomer and about 10 to 60% by weight of a monomer copolymerizable with said aromatic vinyl monomer; (B) about 0.1 to about 10 parts by weight of a ring-shaped alkyl phosphonate ester compound; and (C) about 0.05 to about 3 parts by weight of a HALS compound.

23 Claims, No Drawings

FLAME RETARDANT THERMOPLASTIC RESIN COMPOSITION HAVING EXCELLENT WEATHERABILITY

CROSS-REFERENCE TO RELATED APPLICATION

This non-provisional application claims priority under 35 USC Section 119 from Korean Patent Application No. 10-2006-135397, filed on Dec. 27, 2006, which is hereby incorporated by reference in its entirety.

FIELD OF THE INVENTION

The present invention relates to a flame retardant thermoplastic resin composition having excellent weatherability.

BACKGROUND OF THE INVENTION

In general, rubber modified aromatic vinyl resins can have excellent mold processability, high mechanical properties, especially impact strength, and good appearance and have accordingly been widely used in the production of many electric or electronic goods and office equipment, among other products. However, rubber modified aromatic vinyl resins can readily catch on fire when they are used in heat-emitting products, such as computers, facsimile machines and the like or high-voltage products. Therefore, attempts have been made to improve the flame-retardant property of rubber modified aromatic vinyl resins.

A widely known method for imparting flame retardancy to rubber modified aromatic vinyl resins is the addition of halogen-containing compounds. Examples of halogen-containing compounds include, for example, polybromodiphenyl ether, tetrabromobisphenol-A, epoxy compounds substituted by bromine, and the like.

Antimony-containing compounds may be employed with halogen-containing compounds to further increase the flame retardancy of the same. However, methods for improving the flame-retardant properties of resins using a halogen- and antimony-containing compound are disadvantageous because hydrogen halide gases released by halogen-containing compounds during molding processes can corrode the mold. Further, such compounds can emit toxic gases if ignited. Polybromodiphenyl ether, which is widely used as a halogen-containing flame retardant, can produce toxic gases such as dioxin or difuran during combustion, and thus a major concern in this field is to develop a flame retardant that does not include a halogen-containing compound.

U.S. Pat. No. 3,639,506 discloses a resin composition using a monomeric aromatic phosphoric acid ester such as a triphenylphosphate with a blend of a styrenic resin and a polyphenylene ether resin. However, the addition of triphenylphosphate reduces the heat-resistance property of the resin composition. Such blends also can exhibit a so called "juicing crack phenomenon" because the triphenylphosphate has high volatility, and thereby can form deposits on the surface of a molding product during a molding process.

WO 2005/012416 discloses a thermoplastic resin composition comprising a rubber modified styrene comprising resin and a ring-shaped alkyl phosphonic acid compound stated to have good dripping flame retardancy without heat resistance deterioration or a volatility problem.

In order to prevent discoloration by light and to improve weatherability of the resin composition, hindered amine light stabilizers (HALS compounds) or UV absorbers (such as benzotriazol based compounds, bezophenone based compounds, and hydroxyphenyl triazine compounds) have been generally employed. HALS compounds may increase weatherability by inhibiting photodecomposition of the polymer. UV absorbers may increase weatherability of the resin by absorbing UV light. However, it is necessary to add HALS compounds or UV absorbers in a large amount to obtain sufficient weatherability.

SUMMARY OF THE INVENTION

One aspect of the invention is a flame retardant thermoplastic resin composition which can have excellent weatherability. The compositions can be suitable for the production of products, including electric and electronic products, requiring both weatherability and flame retardancy.

The flame retardant thermoplastic resin composition of the invention can include (A) about 100 parts by weight of a rubber modified aromatic vinyl resin; (B) about 0.1 to about 10 parts by weight of a ring-shaped alkyl phosphonate ester compound; and (C) about 0.05 to about 3 parts by weight of a HALS compound.

The inventors of this application have found that combining a ring-shaped alkyl phosphonate ester compound together with a HALS compound can improve the weatherability of a flame retardant rubber modified aromatic vinyl resin. In exemplary embodiments of the invention, the resin compositions can exhibit a color change of 1.0 or less, for example 0.5 or less, as another example 0.23 or less, and as yet another example 0.15 or less, measured in accordance with ASTM D 4459 using a 4 cm×5 cm×0.3 cm test specimen exposed for 300 hours.

The resin compositions of the invention can also have good dripping flame retardancy as well as excellent weatherability. Because the present invention employs a ring-shaped alkyl phosphonate ester compound as a flame retardant, the flame retardant thermoplastic resin composition can be environmentally friendly. In contrast, prior flame retardant compositions including a halogen-containing compound can cause environmental pollution during molding processes or combustion of the resin.

In exemplary embodiments of the invention, the rubber modified aromatic vinyl resin (A) comprises ($a_1$) about 15 to about 100% by weight of a grafted copolymer resin prepared by graft-polymerizing about 5 to about 65% by weight of a rubbery polymer, about 10 to about 95% by weight of an aromatic vinyl monomer and about 0 to about 40% by weight of a monomer copolymerizable with the aromatic vinyl monomer; and ($a_2$) about 0 to about 85% by weight of a copolymer resin prepared by polymerizing about 40 to about 90% by weight of an aromatic vinyl monomer and about 10 to about 60% by weight of a monomer copolymerizable with the aromatic vinyl monomer. In certain embodiments, the rubber modified aromatic vinyl resin (A) can be selected from copolymers of acrylonitrile-butadiene-styrene (ABS), copolymers of acrylonitrile-acrylic rubber-styrene (AAS), copolymers of acrylonitrile-ethylenepropylene rubber-styrene (AES), high impact polystyrene resins (HIPS), and combinations thereof.

In exemplary embodiments of the invention, the ring-shaped alkyl phosphonate ester compound is represented by the following Formula 1:

[Formula 1]

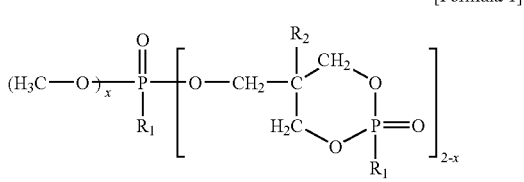

wherein $R_1$ and $R_2$ are independently of each other $C_1$-$C_4$ alkyl group and x is 0 or 1.

In exemplary embodiments of the invention, the HALS compound (C) has a hindered amine structural unit represented by the following Formula 2:

[Formula 2]

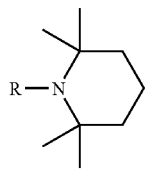

wherein R is hydrogen, $C_1$-$C_3$ alkyl group or acetyl group.

In certain embodiments, the resin composition can further include an aromatic phosphate ester compound.

Another aspect of the invention provides a molded article comprising the foregoing thermoplastic resin composition. The molded article is suitable for electric or electronic products that require weatherability and flame retardancy.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Rubber Modified Aromatic Vinyl Resin

The rubber modified aromatic vinyl resin can be a polymer in which rubber phase polymers are dispersed in the form of particles in a matrix obtained by polymerizing aromatic vinyl group-containing monomers. In exemplary embodiments of the invention, the rubber modified aromatic vinyl resins may be prepared by polymerizing the aromatic vinyl group-containing monomers with rubbers. Other monomers copolymerizable with the aromatic vinyl monomers may also be employed with the aromatic vinyl monomers.

The rubber modified aromatic vinyl resin may be prepared by methods such as emulsion polymerization, suspension polymerization, bulk polymerization, and by extrusion of a graft copolymer resin and a copolymer resin. In bulk polymerization, both a graft copolymer resin and a copolymer resin are prepared together in one process. In other polymerizations, the graft copolymer resin and the copolymer resin may be prepared separately. Regardless of the polymerization technique used, the rubber content in a final rubber modified aromatic vinyl resin can be about 5 to about 30% by weight.

In the rubber modified aromatic vinyl resin of the present invention, the graft copolymer resin can be used alone or in combination with the copolymer resin, depending on the compatibility thereof.

(a$_1$) Graft Copolymer Resin

The graft copolymer resin (a$_1$) may be prepared by graft-polymerizing rubbery polymer, aromatic vinyl monomer and optionally copolymerizable monomer with the aromatic vinyl monomer.

In exemplary embodiments of the invention, the graft copolymer resin can include from about 5 to about 65% by weight of the rubbery polymer, from about 10 to about 95% by weight of the aromatic vinyl monomer and from about 0 to about 40% by weight of the copolymerizable monomer with the aromatic vinyl monomer.

Examples of rubbery polymers suitable for preparing the graft copolymer can include diene rubbers such as polybutadiene, poly(styrene-butadiene), poly(acrylonitrile-butadiene), and the like; saturated rubbers in which hydrogen is added to a diene-containing rubber; isoprene rubbers; acrylic rubbers such as polybutyl acrylic acid; and ethylene-propylene rubbers, terpolymers of ethylene-propylene-diene (EPDM), and the like. The rubbery polymer can be used alone or in combination with one another. The content of rubber in the graft copolymer resin can range from about 5 to about 65% by weight, based on the total weight of the graft copolymer resin.

Examples of the aromatic vinyl monomer may include styrene, α-methylstyrene, p-methylstyrene, and the like. These aromatic vinyl monomers can be used alone or in combination with one another.

The graft copolymer resin can include at least one other monomer copolymerizable with the aromatic vinyl monomer. Examples of monomers which may be copolymerized with the aromatic vinyl monomers may include a cyanide vinyl-containing compound such as acrylonitrile or an unsaturated nitrile-containing compound such as methacrylonitrile. The graft copolymer resin may also include other monomers such as acrylic acid, methacrylic acid, maleic anhydride, N-substituted maleimide, and the like, and combinations thereof, in order to impart good processability and heat resistance.

The average size of rubber particles can range from about 0.1 to about 4 μm.

(a$_2$) Copolymer Resin

The copolymer resin of the present invention may be prepared by copolymerizing aromatic vinyl monomer and copolymerizable monomer with the aromatic vinyl monomer.

In exemplary embodiments of the invention, the copolymer resin (a$_2$) may be prepared by copolymerizing from about 40 to about 90% by weight of the aromatic vinyl monomer and from about 10 to about 60% by weight of the copolymerizable monomer with the aromatic vinyl monomer.

Examples of the aromatic vinyl monomer may include styrene, α-methylstyrene, p-methylstyrene, and the like. These aromatic vinyl monomers can be used alone or in combination with one another. Examples of the monomer copolymerizable with the aromatic vinyl monomer may include a cyanide vinyl-containing compound such as acrylonitrile or an unsaturated nitrile-containing compound such as methacrylonitrile. The copolymer resin may also include other monomers such as acrylic acid, methacrylic acid, maleic anhydride, N-substituted maleimide, and the like, and combinations thereof, in order to impart give good processability and heat resistance.

In exemplary embodiments of the invention, the rubber modified aromatic vinyl resins can be copolymer resins of acrylonitrile-butadiene-styrene (ABS), copolymer resins of acrylonitrile-acrylic rubber-styrene (AAS), copolymer resins of acrylonitrile-ethylenepropylene rubber-styrene (AES), high impact polystyrene resin (HIPS), and the like, and combinations thereof.

The rubber modified aromatic vinyl resin can include about 15 to about 100% by weight of the graft copolymer resin and about 0 to about 85% by weight of the copolymer resin.

(B) Ring-Shaped Alkyl Phosphonate Ester Compound

The ring-shaped alkyl phosphonate ester compound may be represented by the following chemical Formula 1:

[Formula 1]

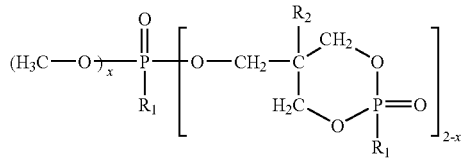

wherein $R_1$ and $R_2$ are independently $C_1$-$C_6$ alkyl, and x is 0 or 1.

Examples of the ring-shaped alkyl phosphonate ester compound having the formula 1 may include methyl-bis(5-ethyl-2-methyl-1,3,2-dioxaphosphorinan-5-yl)methyl methyl phosphonate ester P-oxide, methyl-bis(5-ethyl-2-methyl-1,3,2-dioxaphosphorinan-5-yl) phosphonate ester P,P'-dioxide, and the like.

The ring-shaped alkyl phosphonate ester compound (B) of present invention can be used alone or in combination with one another.

The ring-shaped alkyl phosphonate ester compound (B) may used in an amount of from about 0.1 to about 10 parts by weight, for example about 0.5 to about 6 parts by weight, and as another example from about 0.7 to about 4 parts by weight, per 100 parts by weight of the rubber modified aromatic vinyl resin (A).

(C) HALS Compound

The HALS (HALS, Hindered Amine Light Stabilizer) (C) is a compound having hindered amine structure represented by the following Formula 2:

[Formula 2]

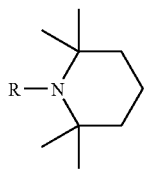

wherein R is hydrogen, $C_1$-$C_3$ alkyl group or acetyl group.

Examples of the HALS compound (C) may include bis (2,2,6,6-tetramethyl-4-piperidinyl)sebacate, tetrakis(2,2,6,6-tetramethyl-4-piperidinyl)1,2,3,4-butanetetracarboxylate, N-acetyl-3-dodecyl-1-(2,2,6,6-tetramethyl-4-piperidinyl) pyrrolidine-2,5-dione, dimethyl succinate polymer of 4-hydroxy-2,2,6,6-tetramethyl-piperidine ethanol and the like.

The HALS compound can be used alone or in combination with one another.

The HALS compound (C) may used in an amount of from about 0.05 to about 3 parts by weight, for example from about 0.1 to about 2 parts by weight, and as another example from about 0.3 to about 1 part by weight, per 100 parts by weight of the rubber modified aromatic vinyl resin (A).

In exemplary embodiments of the invention, the thermoplastic resin composition may further comprise an aromatic phosphate ester compound. The aromatic phosphate ester compound may be represented by the following Formula 3:

[Formula 3]

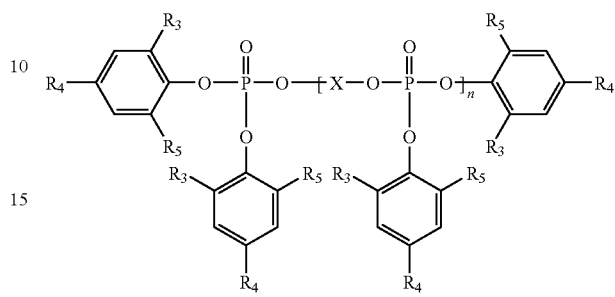

wherein $R_3$, $R_4$ and $R_5$ independently of one another are hydrogen or $C_{1-4}$ alkyl group; X is $C_{6-20}$ aryl group or $C_{1-4}$ alkyl-substituted $C_{6-20}$ aryl group derived from resorcinol, hydroquinol or bisphenol-A; and n is 0 to 4

The aromatic phosphate ester compound may used in an amount of from about 0.1 to about 10 parts by weight, per 100 parts by weight of the rubber modified aromatic vinyl resin (A).

Other additives may be included in the thermoplastic resin composition of the present invention. Examples of such additives include without limitation heat stabilizers, anti-oxidants, light stabilizers, compatibilizers, organic or inorganic pigments, inorganic fillers and the like, and combinations thereof. The additives can comprise about 0.001 to about 30 parts by weight, per 100 parts by weight of the rubber modified aromatic vinyl resin (A).

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES (A) Rubber Modified Aromatic Vinyl Resin ($a_1$) Graft Copolymer Resin ($a_{11}$) Styrene-Acrylonitrile Containing Graft Copolymer Resin 58 parts of butadiene rubber latex powder, 32 parts of styrene, 10 parts of acrylonitrile, and 150 parts of deionized water are mixed. To the mixture, 1.0 part of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain g-ABS latex. To the g-ABS latex, 0.4 parts of sulfuric acid is added and coagulated to obtain rubber modified polystyrene resin (g-ABS) in a powder form.

($a_{12}$) High Impact Polystyrene (HIPS)

High Impact Polystyrene (product name: HG-1760S) having 7.5% by weight of butadiene rubber content and about 0.4 μm of average rubber particle size, produced by Cheil Industries Inc. of Korea is used.

($a_2$) Copolymer Resin 72 parts of styrene, 28 parts of acrylonitrile, and 120 parts of deionized water are mixed. To the mixture, 0.2 parts of azobisisobutylonitrile (AIBN), 0.4 parts of tricalcium phosphate and 0.2 parts of mercaptan-containing chain transfer agent are added. The resultant solution is heated to 80° C. for 90 minutes and kept for 180 minutes. The resultant is washed, dehydrated and dried to obtain styrene-acrylonitrile copolymer resin (SAN) in powder form.

(B) Ring-Shaped Alkyl Phosphonate Ester Compound

Amgard-CU (pale yellow viscous liquid) manufactured from Rhodia Co. of France is used.

(C) HALS Compound ($C_1$) Bis(2,2,6,6-tetramethyl-4-piperidinyl)sebacate manufactured by Ciba-Geigy company of Swiss (product name: Tinuvin 770 DF) is used.

($C_2$) Dimethyl succinate polymer of 4-hydroxy-2,2,6,6-tetramethyl-piperidine ethanol manufactured by Asahi-Denka company of Japan (product name: ADK STAB LA-63P) is used.

(D) Benzotriazolic Compound (UV Absorber)

2-(2-hydroxy-5-methyl-phenyl)benzotriazol manufactured by Ciba-Geigy company of Swiss (product name: Tinuvin P) is used.

(E) Aromatic Phosphate Ester Compound

Resorcinol bis(2,6-dimethylphenyl)phosphate manufactured by Daihachi Chemical of Japan (product name: PX200) is used.

Examples 1~5 and Comparative Examples 1~6

The components as shown in Table 1 are mixed and the mixture is extruded at 180~250° C. with a conventional twin screw extruder in pellets. The resin pellets are dried at 70° C. for 2 hours, and molded into test specimens using a 6 oz injection molding machine at 180~280° C. with a barrel temperature of 40~80° C. The physical properties of the test specimens are measured as follow, and the results are shown in table 1.

(1) Flame Retardancy: The flame retardancy is measured in accordance with UL94 VB. The test specimens have a thickness of 1/12" inch.

(2) Notch Izod impact strength: The notch Izod impact strength is measured in accordance with ASTM 256 A (1/8" notched).

(3) Weatherability: The weatherability is measured in accordance with ASTM D 4459 using test specimens of 4 cm×5 cm×0.3 cm which are exposed for 300 hours. The color change from the initial color after exposure is given as Delta E.

As shown in Table 1, the resin compositions employing the ring-shaped alkyl phosphonate ester compound and HALS compound show good flame retardancy and impact resistance and low discoloration. However, the resin compositions of Comparative Examples 3-5 not using the ring-shaped alkyl phosphonate ester compound or Comparative Examples 2 and 6 in which benzotriazolic compound is used instead of the ring-shaped alkyl phosphonate ester compound exhibit poor weatherability.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant thermoplastic resin composition comprising:
    (A) about 100 parts by weight of a rubber modified aromatic vinyl resin;
    (B) about 0.1 to about 10 parts by weight of a ring-shaped alkyl phosphonate ester compound; and
    (C) about 0.05 to about 3 parts by weight of a hindered amine light stabilizer (HALS) compound.

2. The flame retardant thermoplastic resin composition of claim 1, wherein said rubber modified aromatic vinyl resin (A) comprises ($a_1$) about 15 to about 100% by weight of a grafted copolymer resin prepared by graft-polymerizing about 5 to about 65% by weight of a rubbery polymer, about 10 to about 95% by weight of an aromatic vinyl monomer and about 0 to about 40% by weight of a monomer copolymerizable with said aromatic vinyl monomer; and ($a_2$) about 0 to about 85% by weight of a copolymer resin prepared by polymerizing about 40 to about 90% by weight of an aromatic vinyl monomer and about 10 to about 60% by weight of a monomer copolymerizable with said aromatic vinyl monomer.

TABLE 1

|  |  | Examples |  |  |  |  | Comparative Examples |  |  |  |  |  |
| --- | --- | --- | --- | --- | --- | --- | --- | --- | --- | --- | --- | --- |
|  |  | 1 | 2 | 3 | 4 | 5 | 1 | 2 | 3 | 4 | 5 | 6 |
| (A) Rubber Modified | ($a_{11}$) | 24 | 24 | 24 | 24 | — | 24 | 24 | 24 | 24 | 24 | — |
| Aromatic Vinyl Resin | ($a_{12}$) | — | — | — | — | 100 | — | — | — | — | — | 100 |
|  | ($a_2$) | 76 | 76 | 76 | 76 | — | 76 | 76 | 76 | 76 | 76 | — |
| (B) Ring-Shaped Alkyl Phosphonate Ester Compound |  | 1.5 | 1.5 | 3 | 1 | 3 | 1.5 | 1.5 | — | — | — | 3 |
| (C) HALS compound | ($C_1$) | 0.5 | — | 0.3 | 0.5 | 0.5 | — | — | 0.5 | 0.5 | — | — |
|  | ($C_2$) | — | 0.5 | 0.2 | — | — | — | — | — | — | — | — |
| (D) Benzotriazolic Compound |  | — | — | — | — | — | — | 0.5 | — | — | 0.5 | 0.5 |
| (E) Aromatic Phosphate Ester Compound |  | — | — | — | 1.5 | — | — | — | — | 6 | 6 | — |
| UL94 flame retardancy |  | V-2 | V-2 | V-2 | V-2 | V-2 | V-2 | V-2 | Fail | V-2 | V-2 | V-2 |
| Weatherability (300 hours, DE) |  | 0.10 | 0.15 | 0.11 | 0.23 | 0.13 | 3.1 | 1.5 | 1.7 | 1.3 | 1.5 | 1.1 |
| Izod Impact strength |  | 21 | 22 | 19 | 19 | 10 | 21 | 22 | 20 | 16 | 16 | 10 |

3. The flame retardant thermoplastic resin composition of claim 2, wherein said rubbery polymer is a diene rubber, a saturated rubber in which hydrogen is added to said diene rubber, an isoprene rubber, an acrylic rubber, an ethylene-propylene rubber, an ethylene-propylene-diene terpolymer (EPDM) or a combination thereof.

4. The flame retardant thermoplastic resin composition of claim 2, wherein said aromatic vinyl monomer is styrene, α-methyl styrene, p-methyl styrene or a combination thereof.

5. The flame retardant thermoplastic resin composition of claim 2, wherein said monomer copolymerizable with the aromatic vinyl monomer is a cyanide vinyl-containing compound, an unsaturated nitrile-containing compound, acrylic acid, methacrylic acid, maleic anhydride, N-substituted maleimide or a combination thereof.

6. The flame retardant thermoplastic resin composition of claim 1, wherein said rubber modified aromatic vinyl resin (A) is selected from copolymers of acrylonitrile-butadiene-styrene (ABS), copolymers of acrylonitrile-acrylic rubber-styrene (AAS), copolymers of acrylonitrile-ethylenepropylene rubber-styrene (AES), high impact polystyrene resins (HIPS), and combinations thereof.

7. The flame retardant thermoplastic resin composition of claim 1, wherein said ring-shaped alkyl phosphonate ester compound is represented by the following Formula 1:

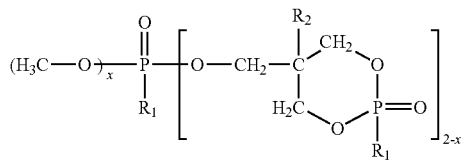

[Formula 1]

wherein $R_1$ and $R_2$ are independently of each other $C_1$-$C_4$ alkyl group and x is 0 or 1.

8. The flame retardant thermoplastic resin composition of claim 1, wherein said HALS compound (C) has a hindered amine structural unit represented by the following Formula 2:

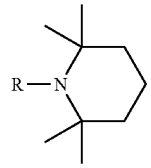

[Formula 2]

wherein R is hydrogen, $C_1$-$C_3$ alkyl group or acetyl group.

9. The flame retardant thermoplastic resin composition of claim 1, further comprising about 0.1 to about 10 parts by weight of an aromatic phosphate ester compound based on 100 parts by weight of the rubber modified aromatic vinyl resin.

10. The flame retardant thermoplastic resin composition of claim 9, wherein said aromatic phosphate ester compound is represented by the following Formula 3:

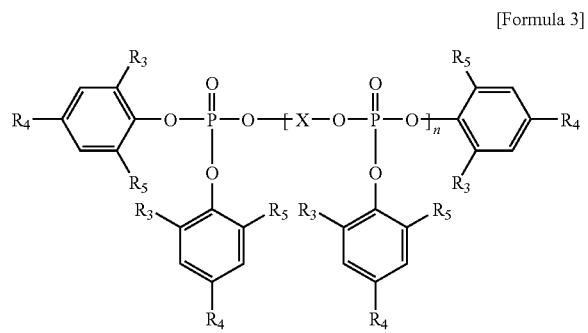

[Formula 3]

wherein $R_3$, $R_4$ and $R_5$ independently of one another are hydrogen or $C_{1-4}$ alkyl group; X is $C_{6-20}$ aryl group or alkyl-substituted $C_{6-20}$ aryl group derived from resorcinol, hydroquinol or bisphenol-A; and n is about 0 to 4.

11. The flame retardant thermoplastic resin composition of claim 1, further comprising about 0.001 to about 30 parts by weight of at least one additive selected from the group consisting of a heat stabilizer, an anti-oxidant, a light stabilizer, a compatibilizer, a pigment, a dye, and an inorganic filler, and combinations thereof.

12. A molded article comprising a thermoplastic resin composition comprising (A) about 100 parts by weight of a rubber modified aromatic vinyl resin; (B) about 0.1 to about 10 parts by weight of a ring-shaped alkyl phosphonate ester compound; and (C) about 0.05 to about 3 parts by weight of a hindered amine light stabilizer (HALS) compound.

13. The molded article of claim 12, wherein said article has a flame retardancy of at least V2, measured in accordance with UL94 VB using a test specimen having a thickness of 1/12″ inch and exhibits a color change of 1.0 or less, measured in, accordance with ASTM D 4459 using a 4 cm×5 cm×0.3 cm test specimen exposed for 300 hours.

14. The molded article of claim 13, wherein said article exhibits a color change of 0.5 or less, measured in accordance with ASTM D 4459 using 4 cm×5 cm×0.3 cm test specimens exposed for 300 hours.

15. The molded article of claim 14, wherein said article exhibits a color change of 0.23 or less, measured in accordance with ASTM D 4459 using 4 cm×5 cm×0.3 cm test specimens exposed for 300 hours.

16. The molded article of claim 15, wherein said article exhibits a color change of 0.15 or less, measured in accordance with ASTM D 4459 using 4 cm×5 cm×0.3 cm test specimens exposed for 300 hours.

17. The flame retardant thermoplastic resin composition of claim 1, wherein:
said ring-shaped alkyl phosphonate ester compound is represented by the following Formula 1:

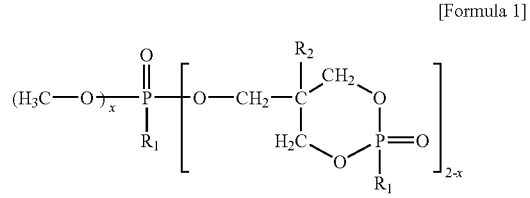

[Formula 1]

wherein $R_1$ and $R_2$ are independently of each other $C_1$-$C_4$ alkyl group and x is 0 or 1; and said HALS compound (C) has a hindered amine structural unit represented by the following Formula 2:

[Formula 2]

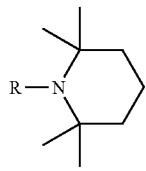

wherein R is hydrogen, $C_1$-$C_3$ alkyl group or acetyl group.

18. The flame retardant thermoplastic resin composition of claim 17, wherein said composition has a flame retardancy of at least V2, measured in accordance with UL94 VB using a test specimen having a thickness of $\frac{1}{12}$" inch and exhibits a color change of 1.0 or less, measured in accordance with ASTM D 4459 using a 4 cm×5 cm×0.3 cm test specimen exposed for 300 hours.

19. The flame retardant thermoplastic resin composition of claim 18, wherein said composition exhibits a color change of 0.5 or less, measured in accordance with ASTM D 4459 using 4 cm×5 cm×0.3 cm test specimens exposed for 300 hours.

20. The flame retardant thermoplastic resin composition of claim 17, further comprising about 0.1 to about 10 parts by weight of an aromatic phosphate ester compound based on 100 parts by weight of the rubber modified aromatic vinyl resin, wherein said aromatic phosphate ester compound is represented by the following Formula 3:

[Formula 3]

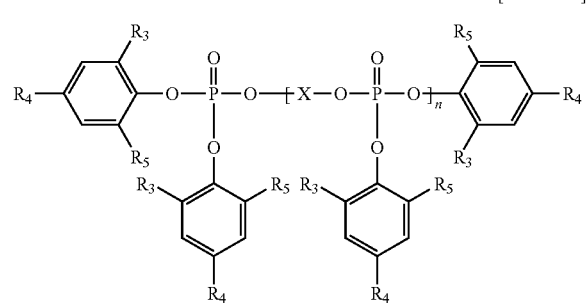

wherein $R_3$, $R_4$ and $R_5$ independently of one another are hydrogen or $C_{1-4}$ alkyl group; X is $C_{6-20}$ aryl group or alkyl-substituted $C_{6-20}$ aryl group derived from resorcinol, hydroquinol or bisphenol-A; and n is about 0 to 4.

21. The molded article of claim 12, said ring-shaped alkyl phosphonate ester compound is represented by the following Formula 1:

[Formula 1]

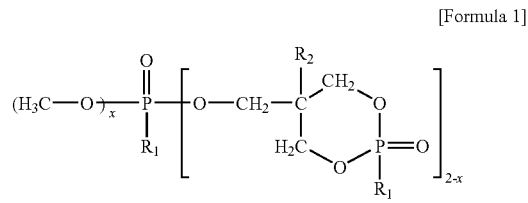

wherein $R_1$ and $R_2$ are independently of each other $C_1$-$C_4$ alkyl group and x is 0 or 1; and said HALS compound (C) has a hindered amine structural unit represented by the following Formula 2:

[Formula 2]

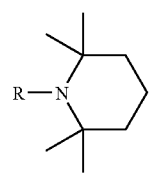

wherein R is hydrogen, $C_1$-$C_3$ alkyl group or acetyl group.

22. The molded article of claim 21, wherein said article has a flame retardancy of at least V2, measured in accordance with UL94 VB using a test specimen having a thickness of $\frac{1}{12}$" inch and exhibits a color change of 1.0 or less, measured in accordance with ASTM D 4459 using a 4 cm×5 cm×0.3 cm test specimen exposed for 300 hours.

23. The molded article of claim 22, wherein said article exhibits a color change of 0.5 or less, measured in accordance with ASTM D 4459 using 4 cm×5 cm×0.3 cm test specimens exposed for 300 hours.

* * * * *